United States Patent
Hong

(10) Patent No.: US 11,557,212 B2
(45) Date of Patent: Jan. 17, 2023

(54) METHOD AND DEVICE FOR DETERMINING FLIGHT PATH OF UNMANNED AERIAL VEHICLE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 341 days.

(21) Appl. No.: 16/770,597

(22) PCT Filed: Dec. 21, 2017

(86) PCT No.: PCT/CN2017/117773
§ 371 (c)(1),
(2) Date: Jun. 6, 2020

(87) PCT Pub. No.: WO2019/119355
PCT Pub. Date: Jun. 27, 2019

(65) Prior Publication Data
US 2021/0366295 A1    Nov. 25, 2021

(51) Int. Cl.
*G08G 5/00* (2006.01)
*B64C 39/02* (2006.01)
(Continued)

(52) U.S. Cl.
CPC .......... *G08G 5/0039* (2013.01); *B64C 39/024* (2013.01); *G05D 1/0022* (2013.01); *B64C 2201/12* (2013.01); *B64C 2201/141* (2013.01)

(58) Field of Classification Search
CPC ...... G08G 5/0039; G08G 5/00; B64C 39/024; B64C 2201/12; B64C 2201/141;
(Continued)

(56) References Cited

U.S. PATENT DOCUMENTS 8,645,005 B2 * 2/2014 Elkins .................. B64B 1/00
244/30
8,849,274 B2 * 9/2014 Wyler .................. H04W 36/14
455/427
(Continued)

FOREIGN PATENT DOCUMENTS

CN         105119650 A     12/2015
CN         105683713 A      6/2016
(Continued)

OTHER PUBLICATIONS

Extended European Search Report (EESR) in the EP application No. 17935454.3 dated May 6, 2021.
(Continued)

*Primary Examiner* — Yonel Beaulieu
(74) *Attorney, Agent, or Firm* — Syncoda LLC; Feng Ma

(57) ABSTRACT

A method for determining a flight path of an unmanned aerial vehicle (UAV) includes: acquiring an initial flight path configured by a management platform; determining, based on the initial flight path, a first group of accessible base stations of the UAV on the initial flight path capable to be accessed when the UAV flies based on the initial flight path; if the first group cannot provide continuous cellular network services for the UAV, acquiring a second group of accessible base stations capable of providing continuous cellular network services for the UAV; and determining the flight path corresponding to the second group as a target flight path. As such, the initial flight path of the UAV can be reasonably adjusted upon that the core network device cannot provide satisfactory network services for the UAV flying according to the initial flight path, to enable the cellular network to provide satisfactory network services for the UAV.

17 Claims, 9 Drawing Sheets

(51) Int. Cl.
*G05D 1/00* (2006.01)
*G01C 21/20* (2006.01)

(58) Field of Classification Search
CPC ...... B64C 39/02; G05D 1/0022; G05D 1/101; G05D 1/00; G01C 21/20
See application file for complete search history.

(56) References Cited

U.S. PATENT DOCUMENTS

| | | | | |
|---|---|---|---|---|
| 9,352,834 | B2* | 5/2016 | Davies | G05D 1/102 |
| 9,853,712 | B2* | 12/2017 | Jalali | H04B 7/18504 |
| 9,859,972 | B2* | 1/2018 | Jalali | H04W 36/0005 |
| 10,269,133 | B2* | 4/2019 | Hildreth | G06T 7/70 |
| 10,429,839 | B2* | 10/2019 | Liu | G01C 21/00 |
| 10,586,464 | B2* | 3/2020 | Dupray | G08G 5/0043 |
| 10,677,771 | B2* | 6/2020 | Dittberner | B64C 39/024 |
| 10,776,744 | B1* | 9/2020 | Kimchi | G08G 5/0026 |
| 11,046,430 | B1* | 6/2021 | Melton | G08G 5/0052 |
| 11,094,204 | B2* | 8/2021 | Trim | G08G 5/0052 |
| 11,166,175 | B2* | 11/2021 | Murphy | H04W 12/069 |
| 2016/0371985 | A1 | 12/2016 | Kotecha | |
| 2017/0012697 | A1* | 1/2017 | Gong | B64C 39/024 |
| 2017/0055273 | A1* | 2/2017 | Sharma | H04L 5/0035 |
| 2018/0077617 | A1* | 3/2018 | Xue | H04L 1/0014 |
| 2018/0109991 | A1* | 4/2018 | Whelan | H04W 24/02 |
| 2020/0178090 | A1* | 6/2020 | Murphy | H04B 7/18504 |
| 2021/0255316 | A1* | 8/2021 | Endo | G05D 1/046 |
| 2022/0173794 | A1* | 6/2022 | Konishi | H04B 7/18504 |

FOREIGN PATENT DOCUMENTS

| | | |
|---|---|---|
| CN | 105828345 A | 8/2016 |
| CN | 106662873 A | 5/2017 |
| WO | 2015114572 A | 8/2015 |
| WO | 2016125161 A1 | 8/2016 |
| WO | 2019028333 A1 | 2/2019 |

OTHER PUBLICATIONS

First Office Action of the Chinese application No. 201780002322.1 dated Feb. 3, 2021.
3GPP TSG-RAN WG2 Meeting#99, Berlin, Germany, Aug. 21, 2017-Aug. 25, 2017; Consideration for potential mobility enhancement for aerial UE.
International Search Report in PCT/CN2017/117773 dated Sep. 7, 2018.

* cited by examiner

METHOD AND DEVICE FOR DETERMINING FLIGHT PATH OF UNMANNED AERIAL VEHICLE

CROSS-REFERENCE TO RELATED APPLICATION

This application is a national stage of International Application No. PCT/CN2017/117773 filed on Dec. 21, 2017, the disclosure of which is hereby incorporated by reference in its entirety.

TECHNICAL FIELD

The present disclosure relates to the technical field of wireless communications, in particular, to a method and a device for determining a flight path of an unmanned aerial vehicle.

BACKGROUND

Unmanned Aerial Vehicles (UAVs) have been applied to some specific scenes to perform tasks such as aerial photography, unmanned detection and reconnaissance, measurement and surveying, highway surveying, city planning, ecological environmental monitoring, scientific investigation, oil exploration, aerial remote sensing, frontier patrol, forest fire prevention, disaster assessment, and the like.

In order to further expand the application range of the unmanned aerial vehicle, the 3rd Generation Partnership Project (3GPP) proposes a study that services meeting the requirements for the unmanned aerial vehicle provided by the cellular network become more standardized in a discussion of the Project of "enhanced support of unmanned aerial vehicles", and the cellular network is considered to determine a flight path of the unmanned aerial vehicle in advance, so that it is helpful to improve mobility of the unmanned aerial vehicle, for example, improving the success rate and speed rate of handover. The related art does not provide a fast handover solution for the cellular network unmanned aerial vehicle; a new solution is required to implement fast handover of the unmanned aerial vehicle.

SUMMARY

In order to solve the problems in the related art, embodiments of the present disclosure provide a method and a device for determining a flight path of an unmanned aerial vehicle, which are applied to a core network device, to reasonably adjust an initial flight path of the unmanned aerial vehicle as determining that satisfactory network services cannot be provided for the unmanned aerial vehicle flying according to the initial flight path configured by a controller, so as to enable the cellular network to provide satisfactory network services for the unmanned aerial vehicle.

According to a first aspect of an embodiment of the present disclosure, a method for determining a flight path of an unmanned aerial vehicle is provided and applied to a core network device. The method includes:

acquiring an initial flight path configured by an unmanned aerial vehicle management platform for the unmanned aerial vehicle;

determining a first group of accessible base stations of the unmanned aerial vehicle on the initial flight path based on the initial flight path, wherein the first group of accessible base stations are base stations capable to be accessed when the unmanned aerial vehicle flies based on the initial flight path;

acquiring a second group of accessible base stations capable of providing continuous cellular network services for the unmanned aerial vehicle, if the first group of accessible base stations are unable to provide the continuous cellular network services for the unmanned aerial vehicle; and determining a flight path corresponding to the second group of accessible base stations as a target flight path.

In one embodiment, the method further includes:
acquiring a coverage area and load information of each of base stations in the first group of accessible base stations;
determining serviceable base stations capable of serving the unmanned aerial vehicle based on the load information for each of the base stations; and
determining that the first group of accessible base stations are unable to provide continuous cellular network services for the unmanned aerial vehicle, if the coverage area of each of the serviceable base stations is unable to fully cover the initial flight path.

In one embodiment, acquiring a second group of accessible base stations capable of providing continuous cellular network services for the unmanned aerial vehicle, includes:
determining a non-coverage area in which cellular network services are unavailable to the unmanned aerial vehicle based on the coverage area of the serviceable base station of the unmanned aerial vehicle;
determining a target base station based on the non-coverage area; and
determining the second group of accessible base stations based on the first group of accessible base stations and the target base station.

In one embodiment, acquiring a coverage area and load information of each of base stations in the first group of accessible base stations, includes:
sending a request message to each of base stations in the first group of accessible base stations; and
receiving the coverage area and the load information returned by each of the base stations based on the request message.

In one embodiment, the method further includes:
sending the target flight path to a currently accessed base station of the unmanned aerial vehicle, wherein the currently accessed base station of the unmanned aerial vehicle forwards the target flight path to the unmanned aerial vehicle; or
sending the target flight path to the currently accessed base station of the unmanned aerial vehicle management platform, wherein the currently accessed base station for the unmanned aerial vehicle management platform forwards the target flight path to the unmanned aerial vehicle management platform.

In one embodiment, acquiring an initial flight path configured by an unmanned aerial vehicle management platform for the unmanned aerial vehicle includes:
receiving the initial flight path sent by the unmanned aerial vehicle through a currently accessed base station of the unmanned aerial vehicle; or
receiving the initial flight path sent by the unmanned aerial vehicle management platform through the currently accessed base station of the unmanned aerial vehicle management platform.

According to a second aspect of the embodiments of the present disclosure, a device for determining a flight path of an unmanned aerial vehicle is provided and applied to a core network device. The device includes:

a first acquisition module configured to acquire an initial flight path configured by the unmanned aerial vehicle management platform for the unmanned aerial vehicle;

a first determination module configured to determine a first group of accessible base stations of the unmanned aerial vehicle on the initial flight path based on the initial flight path acquired by the first acquisition module, wherein the first group of accessible base stations are base stations capable to be accessed when the unmanned aerial vehicle flies based on the initial flight path;

a second acquisition module configured to acquire a second group of accessible base stations capable of providing continuous cellular network services for the unmanned aerial vehicle when the first group of accessible base stations determined by the first determination module are unable to provide the continuous cellular network services for the unmanned aerial vehicle; and a second determination module configured to determine a flight path corresponding to the second group of accessible base stations and acquired by the second acquisition module as a target flight path.

In one embodiment, the device further includes:

a third acquisition module configured to acquire a coverage area and load information of each of base stations in the first group of accessible base stations;

a third determination module configured to determine serviceable base stations capable of serving the unmanned aerial vehicle based on the load information for each of base stations; and a fourth determination module configured to determine that the first group of accessible base stations are unable to provide continuous cellular network services for the unmanned aerial vehicle when the coverage area of each of the serviceable base stations is unable to fully cover the initial flight path.

In one embodiment, the second acquisition module includes:

a first determination sub-module configured to determine a non-coverage area in which cellular network services are unavailable to the unmanned aerial vehicle based on the coverage area of the serviceable base station of the unmanned aerial vehicle;

an acquisition sub-module configured to determine a target base station based on the non-coverage area; and a second determination sub-module configured to determine the second group of accessible base stations, based on the first group of accessible base stations and the target base station.

In one embodiment, the third acquisition module includes:

a sending sub-module configured to send a request message to each of base stations in the first group of accessible base stations; and a first receiving sub-module configured to receive the coverage area and the load information returned by each of the base stations based on the request message.

In one embodiment, the device further includes:

a first sending module configured to send the target flight path to a currently accessed base station of the unmanned aerial vehicle, wherein the currently accessed base station for the unmanned aerial vehicle forwards the target flight path to the unmanned aerial vehicle; or a second sending module configured to send the target flight path to a currently accessed base station of the unmanned aerial vehicle management platform, wherein the currently accessed base station for the unmanned aerial vehicle management platform forwards the target flight path to the unmanned aerial vehicle management platform.

In one embodiment, the first acquisition module includes:

a second receiving sub-module configured to receive the initial flight path sent by the unmanned aerial vehicle through the currently accessed base station of the unmanned aerial vehicle; or a third receiving sub-module configured to receive the initial flight path sent by the unmanned aerial vehicle management platform through a currently accessed base station of the unmanned aerial vehicle management platform.

According to a third aspect of the embodiments of the present disclosure, a core network device is provided. The core network device includes:

a processor;
a memory for storing processor-executable instructions;
wherein the processor is configured to:

acquire an initial flight path configured by an unmanned aerial vehicle management platform for the unmanned aerial vehicle;

determine a first group of accessible base stations of the unmanned aerial vehicle on the initial flight path based on the initial flight path, wherein the first group of accessible base stations are base stations capable to be accessed when the unmanned aerial vehicle flies based on the initial flight path;

acquire a second group of accessible base stations capable of providing continuous cellular network services for the unmanned aerial vehicle, if the first group of accessible base stations are unable to provide the continuous cellular network services for the unmanned aerial vehicle; and determine a flight path corresponding to the second group of accessible base stations as a target flight path.

According to a fourth aspect of the embodiments of the present disclosure, a non-transitory computer readable storage medium having computer instructions stored thereon is provided. The instructions are executed by a processor to perform the following steps of:

acquiring an initial flight path configured by an unmanned aerial vehicle management platform for the unmanned aerial vehicle;

determining a first group of accessible base stations of the unmanned aerial vehicle on the initial flight path based on the initial flight path, wherein the first group of accessible base stations are base stations capable to be accessed when the unmanned aerial vehicle flies based on the initial flight path;

acquiring a second group of accessible base stations capable of providing continuous cellular network services for the unmanned aerial vehicle, if the first group of accessible base stations are unable to provide the continuous cellular network services for the unmanned aerial vehicle; and determining a flight path corresponding to the second group of accessible base stations as a target flight path.

The technical solution provided by the embodiments of the present disclosure may have beneficial effects below.

The core network device can acquire the initial flight path configured by the unmanned aerial vehicle management platform for unmanned aerial vehicle, and can reasonably adjust the initial flight path of the unmanned aerial vehicle to acquire the target flight path as determining that the satisfactory network services cannot be provided for the unmanned aerial vehicle flying according to the initial flight path, so as to enable the cellular network to provide satisfactory network services for the unmanned aerial vehicle, and facilitate improving mobility of the unmanned aerial vehicle.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute part of this specification, illustrate embodiments consistent with the invention and together with the description, serve to explain the principles of the invention.

DETAILED DESCRIPTION

Figure 1A:
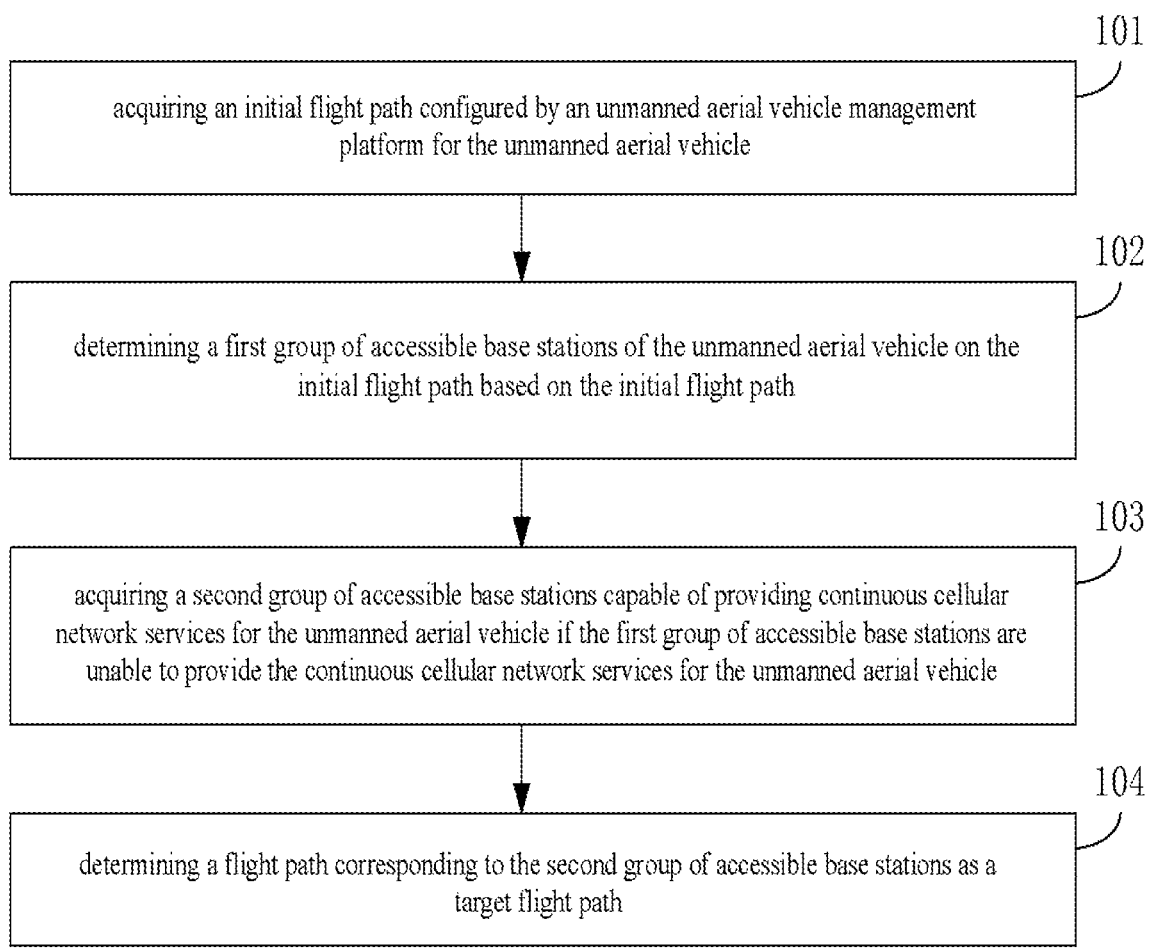
FIG. 1A is a flow chart showing a method for determining a flight path for an unmanned aerial vehicle, according to an exemplary embodiment.

Exemplary embodiments will be described in detail herein, examples of which are illustrated in the drawings. When the following description refers to the drawings, the same numbers in different drawings represent the same or similar elements, unless otherwise indicated. The implementations described in the following exemplary embodiments do not represent all implementations consistent with the present disclosure. Instead, the embodiments are merely examples of devices and methods consistent with aspects of the present disclosure as described in detail in the appended claims.

In this disclosure, the unmanned aerial vehicle is a cellular network unmanned aerial vehicle that accesses to a cellular network.

Figure 1B:
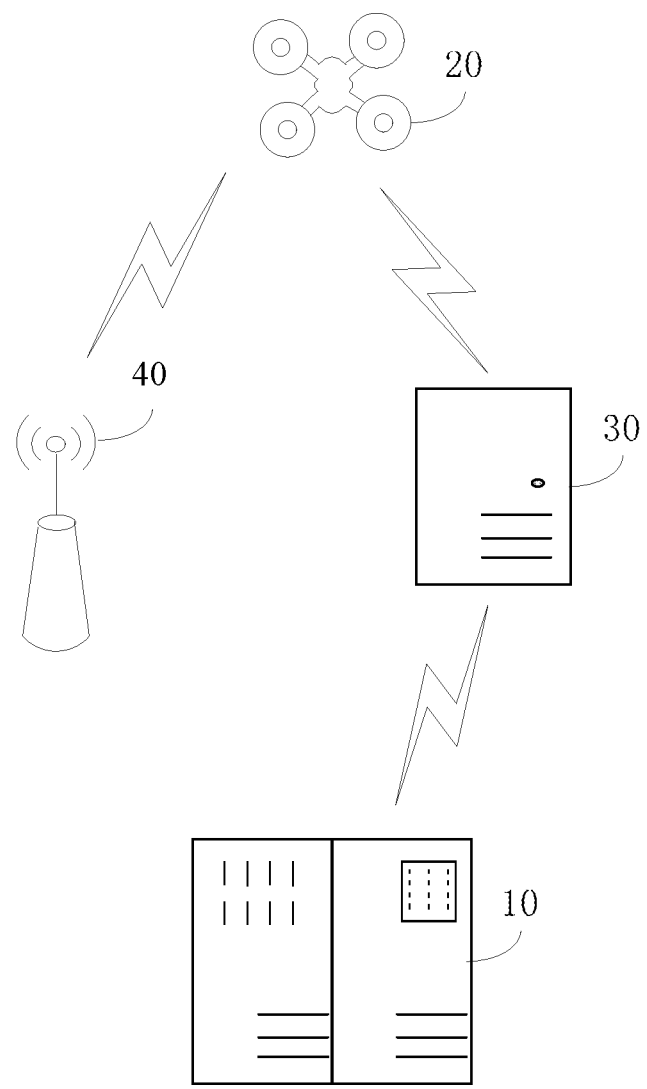
FIG. 1B is a scene diagram showing a method for determining a flight path of an unmanned aerial vehicle, according to an exemplary embodiment.

FIG. 1A is a flow chart showing a method for determining a flight path for an unmanned aerial vehicle, according to an exemplary embodiment, and FIG. 1B is a scene diagram showing a method for determining a flight path of an unmanned aerial vehicle, according to an exemplary embodiment. The method for determining the flight path of the unmanned aerial vehicle can be applied to a core network device, and as shown in FIG. 1A, the method for determining the flight path of the unmanned aerial vehicle includes the following steps 101-104.

In step 101, an initial flight path configured by the unmanned aerial vehicle management platform for the unmanned aerial vehicle is acquired.

In one embodiment, after setting the initial flight path of the unmanned aerial vehicle, the unmanned aerial vehicle management platform may directly send the initial flight path to the core network device through a currently accessed base station currently accessed by the unmanned aerial vehicle management platform, so that the core network device may receive the initial flight path configured by the unmanned aerial vehicle management platform. In another embodiment, after setting the initial flight path of the unmanned aerial vehicle, the unmanned aerial vehicle management platform may send the initial flight path to the unmanned aerial vehicle, and the unmanned aerial vehicle sends the initial flight path to the core network device through the currently accessed base station currently accessed by the unmanned aerial vehicle, so that the core network device may receive the initial flight path configured by the unmanned aerial vehicle management platform.

In one embodiment, when a flight mode of the unmanned aerial vehicle is generally a fixed mode, the unmanned aerial vehicle management platform may preset the flight path of the unmanned aerial vehicle, while when the flight mode of the unmanned aerial vehicle is a dynamic mode, that is, when the unmanned aerial vehicle is remotely controlled in real time by the user through the controller, the unmanned aerial vehicle management platform may not preset the flight path.

In step 102, based on the initial flight path, a first group of accessible base stations of the unmanned aerial vehicle on the initial flight path is determined.

In one embodiment, the core network device may determine a first group of accessible base stations when the unmanned aerial vehicle flies according to the flight path, based on the coverage area of each of the base stations and the flight path of the unmanned aerial vehicle. In one embodiment, the first group of accessible base stations may be understood as base stations through which the unmanned aerial vehicle may fly based on the flight path, for example, the unmanned aerial vehicle passes through coverage areas of base stations 1, 2, 3, 4, and 5 on the flight path, and the first group of accessible base stations may include the base stations 1, 2, 3, 4, and 5, but the base stations 2 and 4 may be overloaded and thereby having no resources left for the other unmanned aerial vehicles to access, and then the unmanned aerial vehicle may only access to the base stations 1, 3, and 5 during the flight, that is, the accessible base stations are base stations to which the unmanned aerial vehicle may, but not necessarily access.

In step 103, if the first group of accessible base stations are unable to provide continuous cellular network services for the unmanned aerial vehicle, a second group of accessible base stations capable of providing continuous cellular network services for the unmanned aerial vehicle are acquired.

Figure 2:
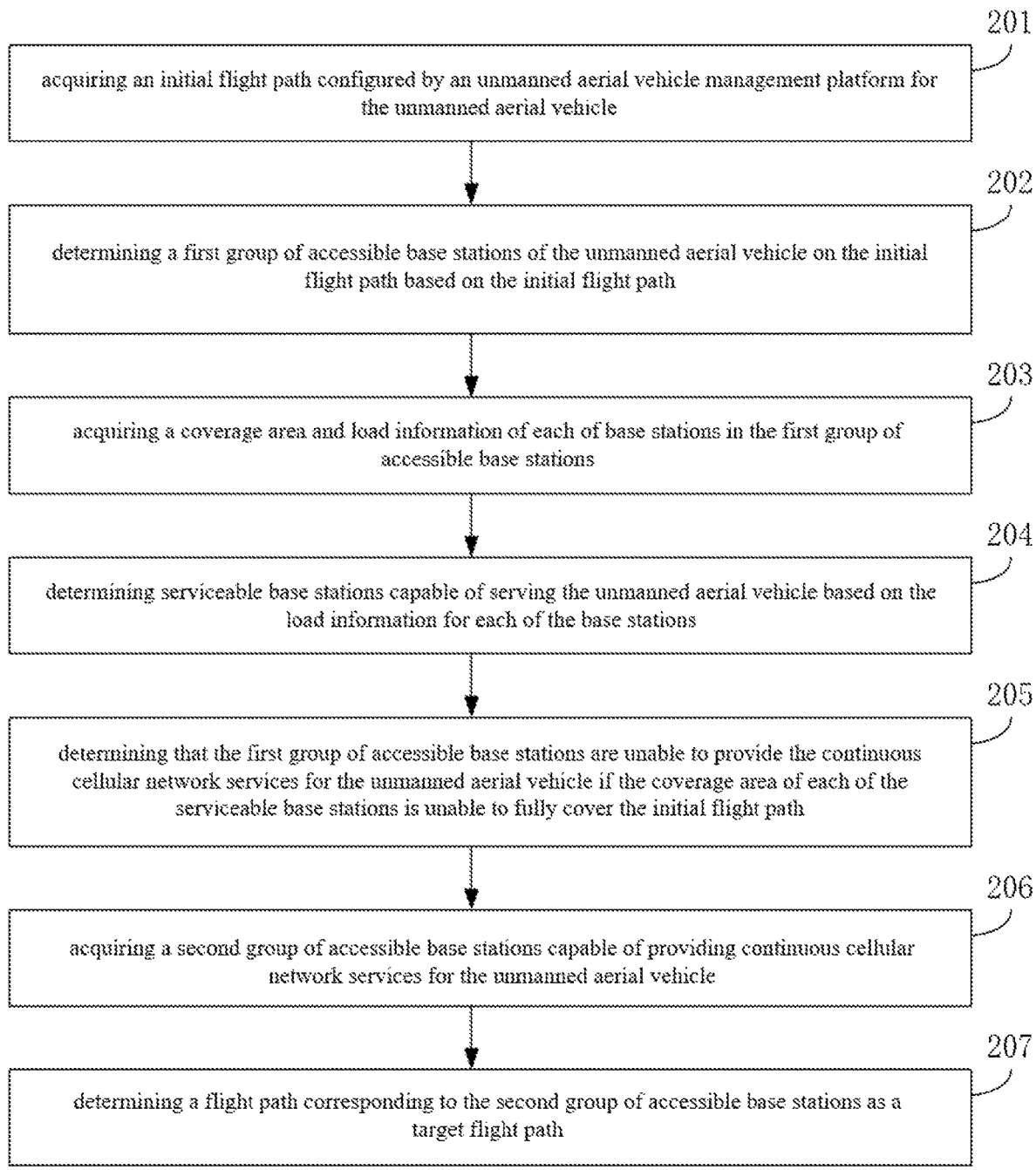
FIG. 2 is a flow chart showing another method for determining a flight path for an unmanned aerial vehicle, according to an exemplary embodiment.

In one embodiment, the coverage area of each of the base stations in the first group of accessible base stations may not be continuous, that is, coverage loopholes exist (i.e., be covered incompletely), so that the unmanned aerial vehicle cannot acquire the cellular network services at the coverage loopholes, and the method for determining whether the first group of accessible base stations can provide the continuous cellular network services for the unmanned aerial vehicle may refer to the embodiment shown in FIG. 2, but not be described in detail herein.

In one embodiment, the second group of accessible base stations are capable of providing continuous cellular network services for the unmanned aerial vehicle, such that the unmanned aerial vehicle may always be supported through the network during flight.

Figure 3A:
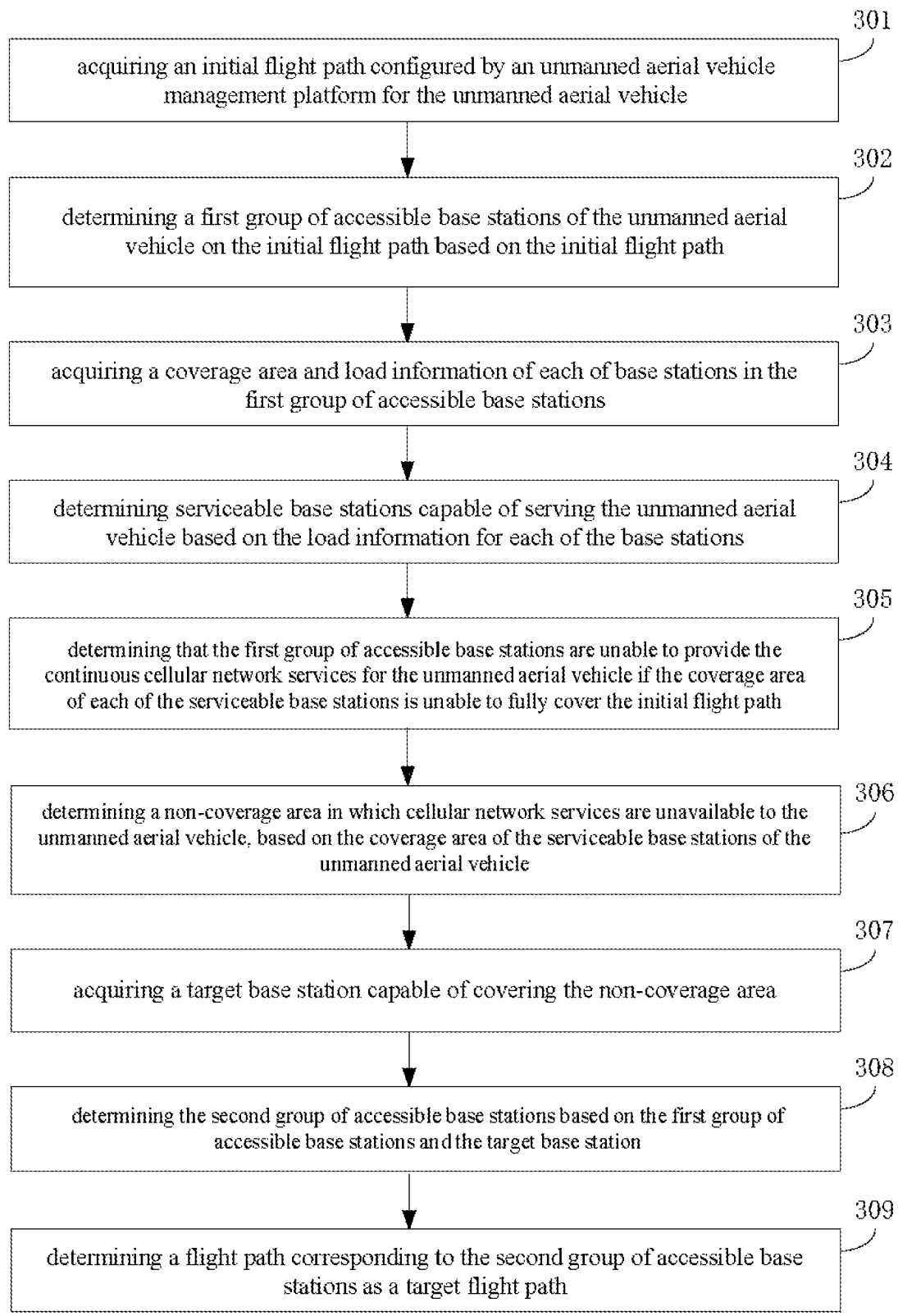
FIG. 3A is a flow chart showing still another method for determining a flight path of an unmanned aerial vehicle according to an exemplary embodiment.

In one embodiment, the method for acquiring the second group of accessible base stations can be referred to the embodiment shown in FIG. 3A, but not be described in detail herein.

In step 104, the flight path corresponding to the second group of accessible base stations is determined as the target flight path.

In one embodiment, the target flight path may be composed of a plurality of coordinate points for indicating a flight route of the unmanned aerial vehicle.

In one embodiment, the core network device may determine a general flight route of the unmanned aerial vehicle based on the base station location information of the second group of accessible base stations, and further determine the target flight path.

In an exemplary scene, as shown in FIG. 1B, in the scene shown in FIG. 1B, an unmanned aerial vehicle management platform 10, an unmanned aerial vehicle 20, a core network device 30, at least one base station 40, and the like are included, wherein the unmanned aerial vehicle management platform 10 may send the initial flight path to the core network device 30 after setting the initial flight path of the unmanned aerial vehicle 20, and if the core network device 30 based on the initial flight path determines that the unmanned aerial vehicle 20 may not be able to acquire continuous cellular network services while flying according to the initial flight path, a target flight path may be determined for the unmanned aerial vehicle 20, and may be indicated to the unmanned aerial vehicle management platform 10, such that the unmanned aerial vehicle management platform 10 instructs the unmanned aerial vehicle 20 to fly according to the target flight path, and the cellular network can provide satisfactory network services for the unmanned aerial vehicle.

In this embodiment, through the foregoing steps 101 to 104, the core network device may acquire the initial flight path configured by the unmanned aerial vehicle management platform for the unmanned aerial vehicle, and when it is determined that satisfactory network services cannot be acquired if the unmanned aerial vehicle flies according to the initial flight path configured by the controller, the initial flight path of the unmanned aerial vehicle is reasonably adjusted to obtain a target flight path, so as to enable the cellular network to provide satisfactory network services for the unmanned aerial vehicle, and facilitate improving the mobility of the unmanned aerial vehicle.

Specifically how to determine the flight path of the unmanned aerial vehicle may refer to the following embodiments.

The technical solutions provided by the embodiments of the present disclosure are described below with specific embodiments.

FIG. 2 is a flow chart showing another method for determining a flight path for an unmanned aerial vehicle according to an exemplary embodiment. In this embodiment, by using the above method provided in the embodiment of the present disclosure, an illustrative description is made as an example of how the core network device determines whether the initial flight path needs to be adjusted, as shown in FIG. 2, the method includes the following steps.

In step 201, an initial flight path configured by the unmanned aerial vehicle management platform for the unmanned aerial vehicle is acquired.

In step 202, based on the initial flight path, a first group of accessible base stations for the unmanned aerial vehicle on the initial flight path is determined.

In one embodiment, the first group of accessible base stations are accessible base stations when the unmanned aerial vehicle flies based on an initial flight path.

In one embodiment, the descriptions of step 201 and step 202 can refer to the descriptions of step 101 and step 102 of the embodiment shown in FIG. 1A, and will not be described in detail herein.

In step 203, a coverage area and load information of each of the base stations in the first group of accessible base stations is acquired.

In one embodiment, the core network device may send a request message to each of the base stations in the first group of accessible base stations, request the base station to report its coverage area and load information, and then receive the coverage area and the load information returned by each of the base stations based on the request message.

In one embodiment, the coverage area of each of the base stations may have been determined and indicated to the base station when the base stations are deployed by an mobile operator, and the coverage area may be a stereo spatial area, for example, a stereo area with a radius of 15 km centered on the geographic location of the base station. The coverage area of each of the base stations is exactly a fixed value, and the core network device may be acquired from a side of the base station, or from the mobile operator management system, and after one time of acquiring, the coverage area of each of the base stations is locally stored.

In one embodiment, the load information of each of the base stations may indicate whether there are any resources left enable to access the new device, the load information of the base station may be updated in real time, the base station may report the load information after the request message of the core network device is received, and the base station may also report the load information periodically.

In step 204, based on the load information of each of the base stations, a serviceable base station capable of serving the unmanned aerial vehicle is determined.

In one embodiment, the serviceable base station may be the base station to which the unmanned aerial vehicle is accessible as flying according to the initial path, that is, the coverage area of the serviceable base stations is suitable for the unmanned aerial vehicle to access, and also the load information of the serviceable base station allows the unmanned aerial vehicle to access.

In step 205, if the coverage area of each of the serviceable base stations does not fully cover the initial flight path, it is determined that the first group of accessible base stations cannot provide continuous cellular network services for the unmanned aerial vehicle.

In one embodiment, if the coverage area of each of the accessible base stations is discontinuous, and the unmanned aerial vehicle can fly through an area that is not covered by any base station as flying according to the initial flight path, it may be determined that the first group of accessible base stations cannot provide continuous cellular network services for the unmanned aerial vehicle.

In step 206, a second group of accessible base stations capable of providing continuous cellular network services for the unmanned aerial vehicle is acquired.

In one embodiment, the method for acquiring the second group of accessible base stations can be referred to the embodiment shown in FIG. 3A, and will not be described in detail herein.

In step 207, the flight path corresponding to the second group of accessible base stations is determined as the target flight path.

In this embodiment, the core network device, based on the coverage area and the load information of each base station in the first group of accessible base stations, may determine whether the initial flight path configured by the unmanned aerial vehicle management platform enables the unmanned aerial vehicle to obtain network service all the time, and then determine whether the initial flight path needs to be adjusted.

Figure 3B:
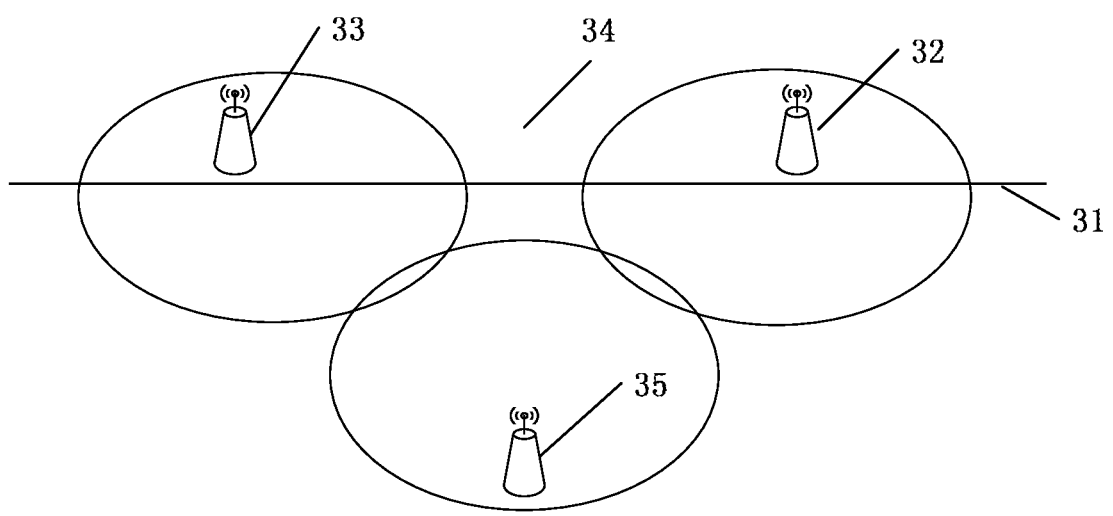
FIG. 3B is a schematic view of a non-coverage area according to an exemplary embodiment.

FIG. 3A is a flow chart showing still another method for determining a flight path for an unmanned aerial vehicle according to an exemplary embodiment, and FIG. 3B is a schematic view of a non-coverage area according to an exemplary embodiment. In this embodiment, by using the above method provided in the embodiment of the present disclosure, an illustrative description is made as an example of how the core network device determines the second group of accessible base stations, and as shown in FIG. 3A, the method includes the following steps.

In step 301, an initial flight path configured by the unmanned aerial vehicle management platform for the unmanned aerial vehicle is acquired.

In step 302, based on the initial flight path, a first group of accessible base stations of the unmanned aerial vehicle on the initial flight path is determined.

In one embodiment, the first group of accessible base stations are accessible when the unmanned aerial vehicle flies based on the initial flight path.

In one embodiment, the descriptions of step 301 and step 302 can refer to the descriptions of step 101 and step 102 in the embodiment shown in FIG. 1A, and will not be described in detail herein.

In step 303, a coverage area and load information for each of the base stations in the first group of accessible base stations are acquired.

In step 304, a serviceable base station capable of serving the unmanned aerial vehicle is determined based on the load information for each of the base stations.

In step 305, if the coverage area of each of the serviceable base stations does not fully cover the initial flight path, it is determined that the first group of accessible base stations cannot provide continuous cellular network services for the unmanned aerial vehicle.

In one embodiment, the descriptions of step 301 to step 305 can refer to the descriptions of step 201 to step 205 in the embodiment shown in FIG. 2, and will not be described in detail herein.

In step 306, a non-coverage area in which the unmanned aerial vehicle cannot obtain cellular network services is determined based on the coverage area of the serviceable base station of the unmanned aerial vehicle.

In step 307, a target base station is determined based on the non-coverage area.

In one embodiment, in steps 306 and 307, the core network device may determine whether there is a non-coverage area based on the coverage area of each of the serviceable base stations, and further determine a target base station; and based on the coverage area of the target base station, the unmanned aerial vehicle may avoid flying through the non-coverage area. Referring to FIG. 3B, the flight path is shown as a line denoted by reference number 31, passing through the coverage areas of the base stations 32 and 33, but there is a non-coverage area between the base station 31 and the base station 32, and an area denoted by reference number 34 is the non-coverage area, and the core network device may determine whether there is a coverage area of a base station from adjacent base stations for the base station 31 and/or the base station 32, to connect the coverage area between the base station 31 and the base station 32, and the base station 35 in FIG. 3B is the target base station.

In step 308, a second group of accessible base stations is determined based on the first group of accessible base stations and the target base station.

In one embodiment, the target base station may be added to the first group of accessible base stations, to obtain a second group of accessible base stations. In one embodiment, the target base station may also be used to replace a part of the base stations in the first group of accessible base stations, thereby obtaining the second group of accessible base stations capable of providing continuous network service for the unmanned aerial vehicle.

In step 309, the flight path corresponding to the second group of accessible base stations is determined as the target flight path.

In this embodiment, the core network device, based on the coverage area and the load information of each of the base stations in the first group of accessible base stations, may determine a non-coverage area that cannot be covered by the cellular network on the initial flight path, and further determine the target base station that can cover the coverage area, to obtain the adjusted target flight path.

Figure 4:
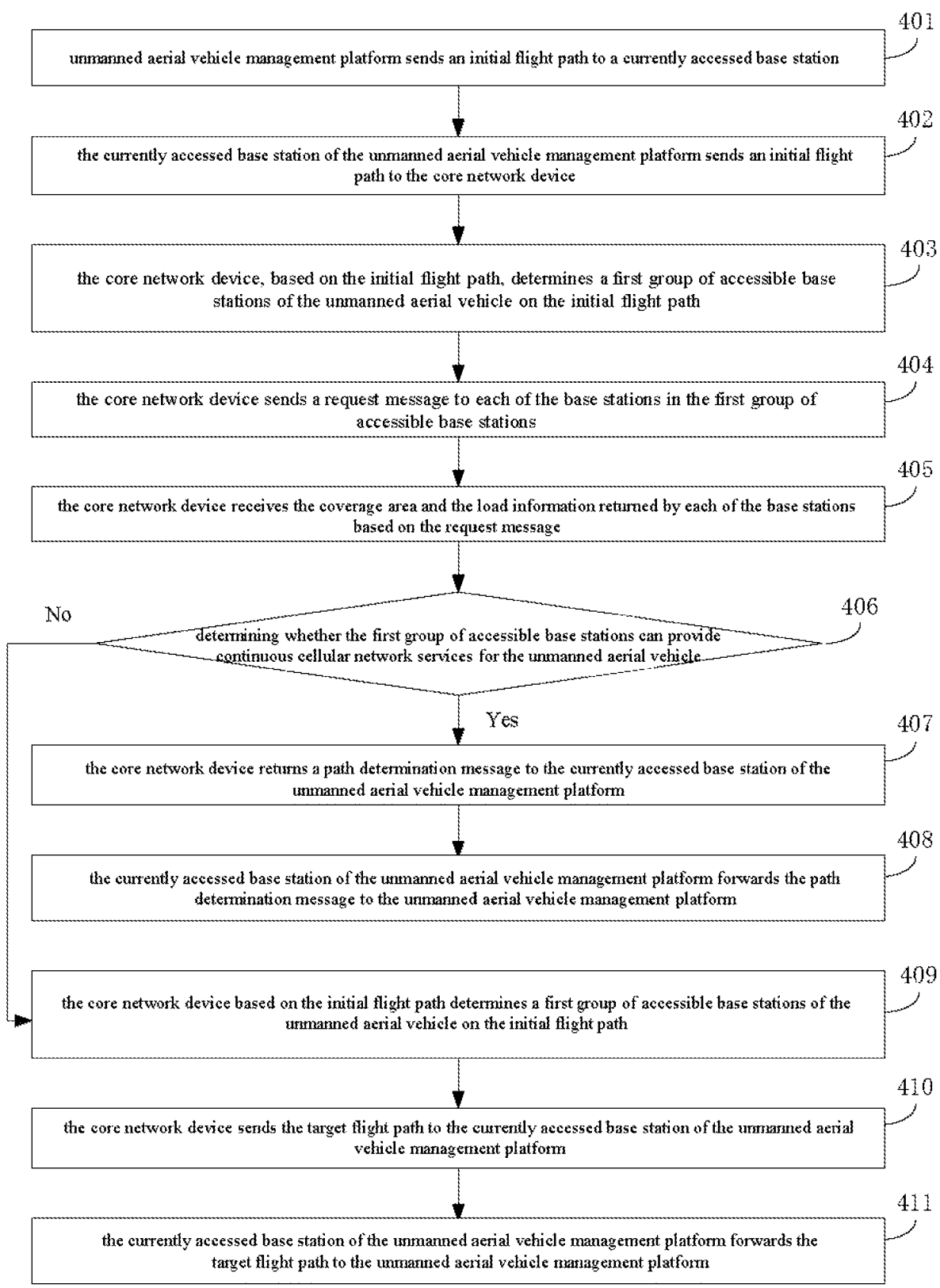
FIG. 4 is a first flowchart showing interaction between communication entities in a method for determining a flight path of an unmanned aerial vehicle according to an exemplary embodiment.

FIG. 4 is a first flowchart showing interaction between communication entities in a method for determining a flight path of an unmanned aerial vehicle according to an exemplary embodiment. In this embodiment, by using the above method provided by the embodiment of the present disclosure, an illustrative description is made as an example that respective communication entities interact with each other and determining a target flight path of an unmanned aerial vehicle, and as shown in FIG. 4, the method includes the following steps.

In step 401, the unmanned aerial vehicle management platform sends an initial flight path to a currently accessed base station.

In one embodiment, if the unmanned aerial vehicle management platform also accesses to the base station, the initial flight path may be sent directly to the currently accessed base station.

In step 402, the currently accessed base station of the unmanned aerial vehicle management platform sends an initial flight path to the core network device.

In step 403, the core network device, based on the initial flight path, determines a first group of accessible base stations of the unmanned aerial vehicle on the initial flight path, wherein the first group of accessible base stations are accessible base stations when the unmanned aerial vehicle flies based on the initial flight path.

In step 404, the core network device sends a request message to each of the base stations in the first group of accessible base stations.

In step 405, the core network device receives the coverage area and the load information returned by each of the base stations based on the request message.

In one embodiment, the coverage area of each of the base stations may have been determined and indicated to the base station when the base stations are deployed by the mobile operator, and the coverage area may be a stereo spatial area, for example, a stereo area with a radius of 15 km centered on the geographic location of the base station. The coverage area of each of the base stations is exactly a fixed value, and the core network device may be acquired from a side of the base station, or from the mobile operator management system, and after one time of acquiring, the coverage area of each of the base stations is locally stored.

In one embodiment, the load information of each of the base stations may indicate whether there are any resources left to enable to access the new device, the load information of the base station may be updated in real time, the base station may report the load information after receiving the request message of the core network device, and the base station may also report the load information periodically.

In step 406, the core network device determines whether the first group of accessible base stations can provide continuous cellular network services for the unmanned aerial vehicle based on the coverage area and the load information returned by each of the base stations based on the request message, if the first group of accessible base stations can provide continuous cellular network services for the unmanned aerial vehicle, step 407 is performed, and if the first group of accessible base stations cannot provide continuous cellular network services for the unmanned aerial vehicle, step 409 is performed.

In step 407, the core network device returns a path determination message to the currently accessed base station of the unmanned aerial vehicle management platform.

In one embodiment, the path determination message is used to indicate that the core network device has determined that the initial flight path configured by the unmanned aerial vehicle management platform is an executable target flight path.

In step 408, the currently accessed base station of the unmanned aerial vehicle management platform forwards the path determination message to the unmanned aerial vehicle management platform, and the process ends.

In one embodiment, the core network device may not perform steps 407 and 408, and the unmanned aerial vehicle management platform may monitor whether there is a returned target flight path within a set time after sending the initial flight path, and if not, it may be determined that the initial flight path configured by the unmanned aerial vehicle management platform is a reasonable flight path that does not need to be adjusted.

In step 409, the core network device acquires a second group of accessible base stations, and determines the target flight path based on the second group of accessible base stations.

In step 410, the core network device sends the target flight path to the currently accessed base station of the unmanned aerial vehicle management platform.

In step 411, the currently accessed base station of the unmanned aerial vehicle management platform forwards the target flight path to the unmanned aerial vehicle management platform.

In this embodiment, an implementation for determining the flight path of the unmanned aerial vehicle is disclosed. The unmanned aerial vehicle management platform may send the initial flight path to the core network device after setting the initial flight path of the unmanned aerial vehicle, the core network device determines whether the path needs to be adjusted based on the coverage range and the load information of the accessible base station on the initial flight path, and determines a reasonable target flight path when the path needs to be adjusted, so that a cellular network can provide satisfactory network services for the unmanned aerial vehicle, and the mobility of the unmanned aerial vehicle is improved.

Figure 5:
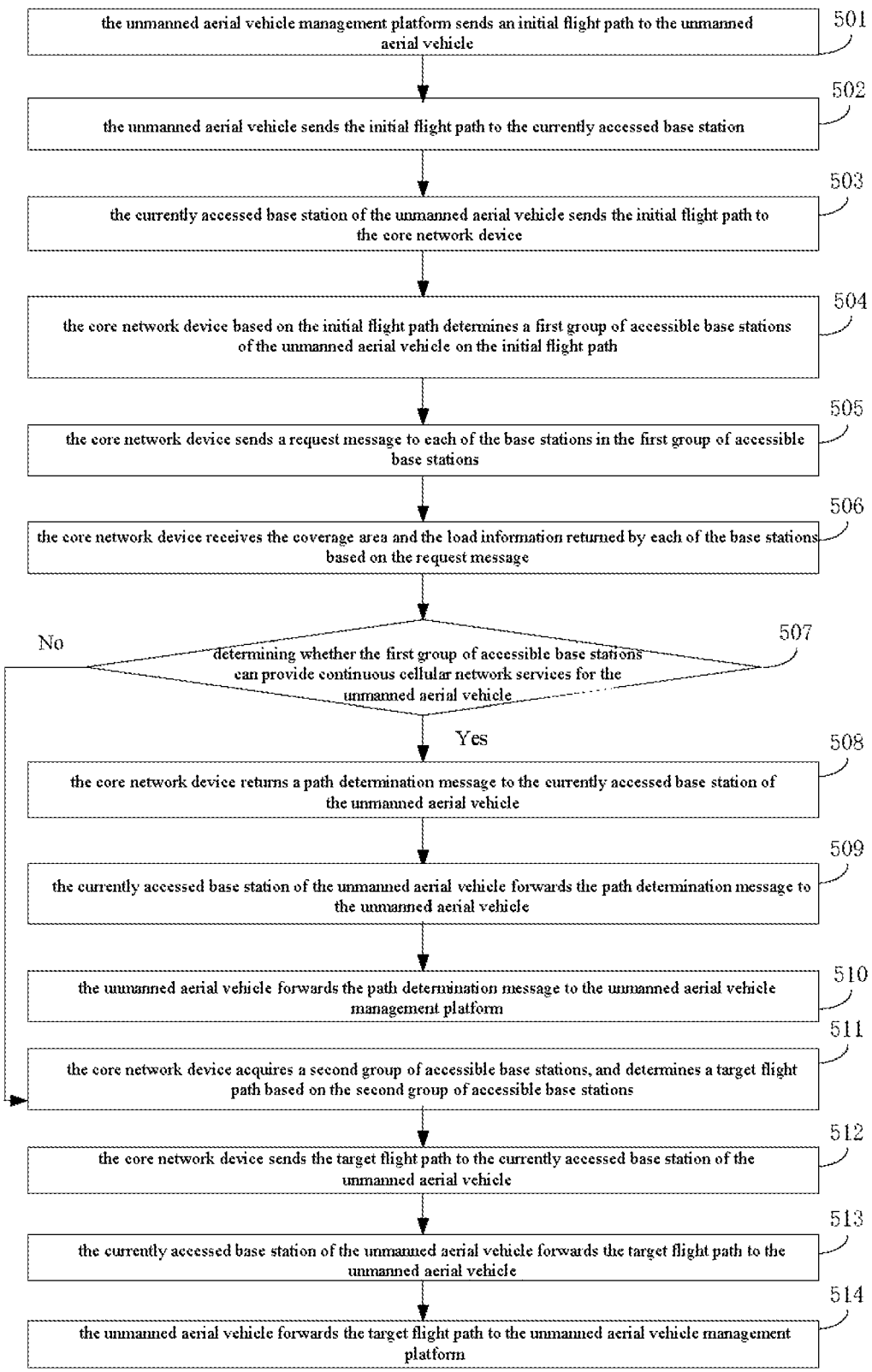
FIG. 5 is a flowchart showing interaction between communication entities in another method for determining a flight path of an unmanned aerial vehicle according to an exemplary embodiment.

FIG. 5 is a flowchart showing interaction between communication entities in another method for determining a flight path of an unmanned aerial vehicle according to an exemplary embodiment. In this embodiment, by using the above method provided by the embodiment of the present disclosure, an illustrative description is made as an example that communication entities interact with each other and a target flight path of an unmanned aerial vehicle is determined, and as shown in FIG. 5, the method includes the following steps.

In step 501, the unmanned aerial vehicle management platform sends an initial flight path to the unmanned aerial vehicle.

In step 502, the unmanned aerial vehicle sends the initial flight path to the currently accessed base station.

In step 503, the currently accessed base station of the unmanned aerial vehicle sends the initial flight path to the core network device.

In one embodiment, in steps 501 to 503, if the unmanned aerial vehicle management platform itself does not access to any base station, the initial flight path may be sent to the unmanned aerial vehicle, and the unmanned aerial vehicle sends the initial flight path to the core network device through the currently accessed base station that is accessed by the unmanned aerial vehicle.

In step 504, the core network device based on the initial flight path determines a first group of accessible base stations of the unmanned aerial vehicle on the initial flight path.

In one embodiment, the first group of accessible base stations are accessible base stations when the unmanned aerial vehicle flies based on an initial flight path.

In step 505, the core network device sends a request message to each of the base stations in the first group of accessible base stations.

In step 506, the core network device receives the coverage area and the load information returned by each of the base stations based on the request message.

In step 507, the core network device determines whether the first group of accessible base stations can provide continuous cellular network services for the unmanned aerial vehicle based on the coverage area and load information returned by each of the base stations based on the request message, if the first group of accessible base stations can provide continuous cellular network services for the unmanned aerial vehicle, step 508 is performed, and if the first group of accessible base stations cannot provide continuous cellular network services for the unmanned aerial vehicle, step 511 is performed.

In step 508, the core network device returns a path determination message to the currently accessed base station of the unmanned aerial vehicle.

In step 509, the currently accessed base station of the unmanned aerial vehicle forwards the path determination message to the unmanned aerial vehicle.

In step 510, the unmanned aerial vehicle forwards the path determination message to the unmanned aerial vehicle management platform, and the process ends.

In step 511, the core network device acquires a second group of accessible base stations, and determines a target flight path based on the second group of accessible base stations.

In step 512, the core network device sends the target flight path to the currently accessed base station of the unmanned aerial vehicle.

In step 513, the currently accessed base station of the unmanned aerial vehicle forwards the target flight path to the unmanned aerial vehicle.

In step 514, the unmanned aerial vehicle forwards the target flight path to the unmanned aerial vehicle management platform.

In this embodiment, an implementation for transmitting the flight path of the unmanned aerial vehicle is disclosed. When the unmanned aerial vehicle management platform does not access to any basic station, the configured initial flight path may be sent to the core network device by the unmanned aerial vehicle, and in this way, the core network device determines whether the path needs to be adjusted based on the coverage area and the load information of the accessible basic stations on the initial flight path, and determine a reasonable target flight path when adjustment is needed, such that the cellular network can provide satisfactory network services for the unmanned aerial vehicle, and the mobility of the unmanned aerial vehicle can be improved.

Figure 6:
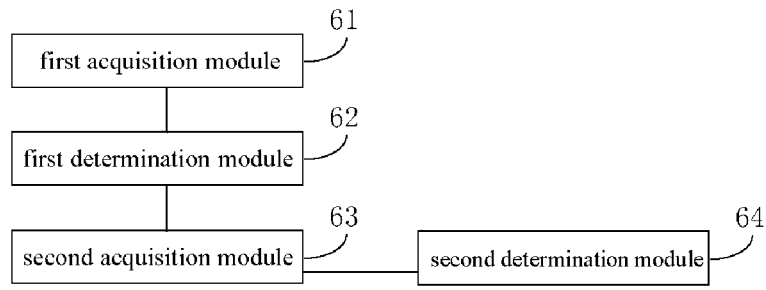
FIG. 6 is a block diagram showing a device for determining a flight path of an unmanned aerial vehicle, according to an exemplary embodiment.

FIG. 6 is a block diagram showing a device for determining a flight path of an unmanned aerial vehicle, which is applied to a core network device, according to an exemplary embodiment. As shown in FIG. 6, the device for determining a flight path of an unmanned aerial vehicle includes:

a first acquisition module 61, which is configured to acquire an initial flight path configured by the unmanned aerial vehicle management platform for the unmanned aerial vehicle;

a first determination module 62, which is configured to determine a first group of accessible base stations of the unmanned aerial vehicle on the initial flight path based on the initial flight path acquired by the first acquisition module 61, wherein the first group of accessible base stations are base stations are capable to be accessed when the unmanned aerial vehicle flies based on the initial flight path;

a second acquisition module 63, which is configured to acquire a second group of accessible base stations capable of providing continuous cellular network services for the unmanned aerial vehicle when the first group of accessible base stations determined by the first determination module 62 are unable to provide the continuous cellular network services for the unmanned aerial vehicle; and a second determination module 64, which is configured to determine a flight path corresponding to the second group of accessible base stations and acquired by the second acquisition module 63 as a target flight path.

Figure 7:
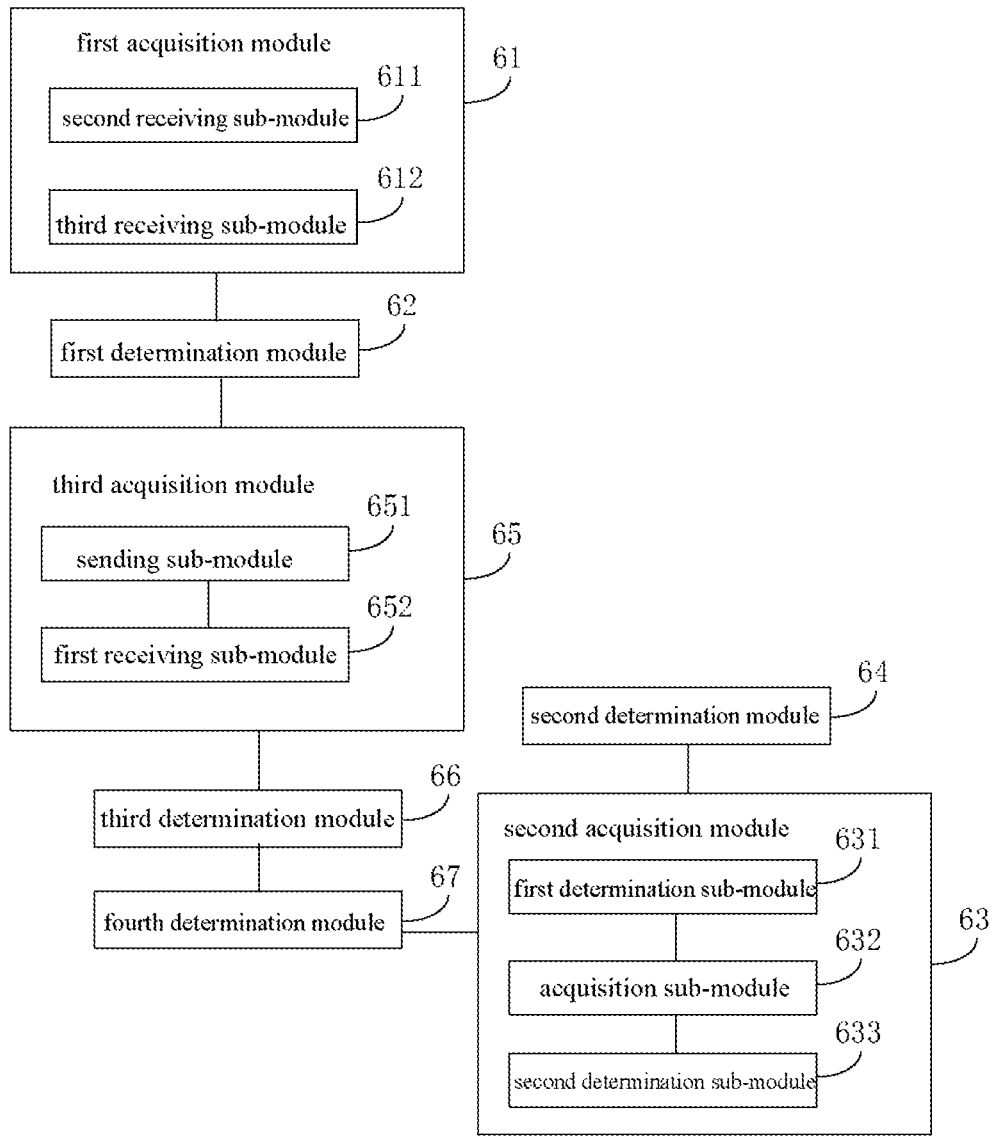
FIG. 7 is a block diagram showing another device for determining a flight path of an unmanned aerial vehicle according to an exemplary embodiment.

FIG. 7 is a block diagram showing another device for determining a flight path of an unmanned aerial vehicle according to an exemplary embodiment. As shown in FIG. 7, and based on the embodiment shown in FIG. 6, in one embodiment, the device further includes:

a third acquisition module 65, which is configured to acquire a coverage area and a load information of each of base stations in the first group of accessible base stations;

a third determination module 66, which is configured to determine serviceable base stations capable of serving the unmanned aerial vehicle based on the load information for each of base stations; and a fourth determination module 67, which is configured to determine that the first group of accessible base stations are unable to provide continuous cellular network services for the unmanned aerial vehicle when the coverage area of each of the serviceable base stations is unable to fully cover the initial flight path.

In one embodiment, the second acquisition module 63 includes:

a first determination sub-module 631, which is configured to determine a non-coverage area in which cellular network services are unavailable to the unmanned aerial vehicle based on the coverage area of the serviceable base station of the unmanned aerial vehicle;

an acquisition sub-module 632, which is configured to determine a target base station based on the non-coverage area; and a second determination sub-module 633, which is configured to determine the second group of accessible base stations based on the first group of accessible base stations and the target base station.

In one embodiment, the third acquisition module 65 includes:

a sending sub-module 651, which is configured to send a request message to each of base stations in the first group of accessible base stations; and a first receiving sub-module 652, which is configured to receive the coverage area and the load information returned by each of the base stations based on the request message.

In one embodiment, the device further includes:

a first sending module 68, which is configured to send the target flight path to a currently accessed base station of the unmanned aerial vehicle, wherein the currently accessed base station for the unmanned aerial vehicle forwards the target flight path to the unmanned aerial vehicle; or a second sending module 69, which is configured to send the target flight path to a currently accessed base station of the unmanned aerial vehicle management platform, wherein the currently accessed base station for the unmanned aerial vehicle management platform forwards the target flight path to the unmanned aerial vehicle management platform.

In one embodiment, the first acquisition module 61 includes:

a second receiving sub-module 611, which is configured to receive the initial flight path sent by the unmanned aerial vehicle through a currently accessed base station of the unmanned aerial vehicle; or a third receiving sub-module 612, which is configured to receive the initial flight path sent by the unmanned aerial vehicle management platform through the currently accessed base station of the unmanned aerial vehicle management platform.

With regard to the device in above embodiments, the specific manners in which each module performs operation have been described in detail in the embodiments related to the method, and will not be described in detail herein.

Figure 8:
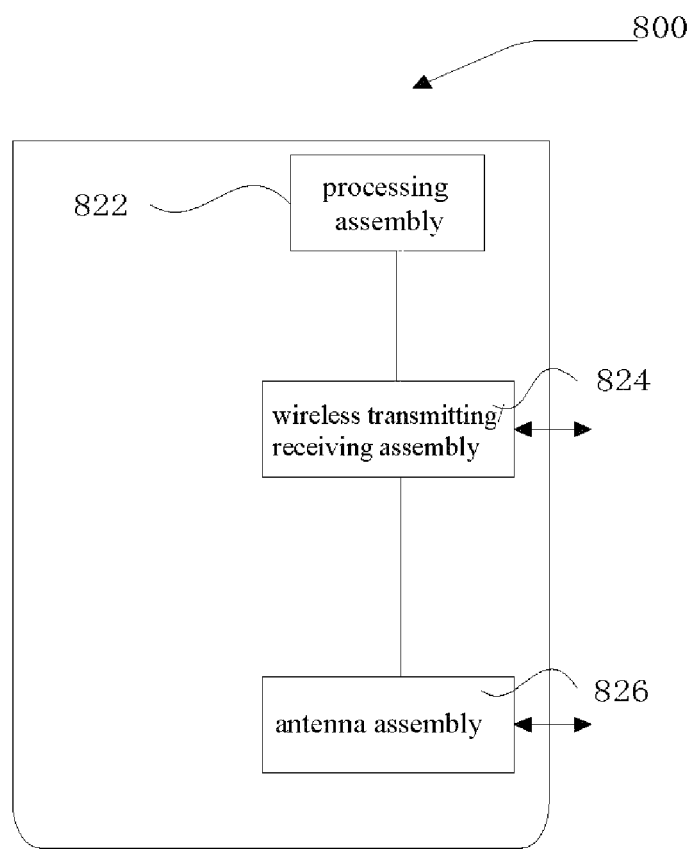
FIG. 8 is a block diagram showing a device suitable for determining a flight path of an unmanned aerial vehicle according to an exemplary embodiment.

FIG. 8 is a block diagram showing a device suitable for determining a flight path of an unmanned aerial vehicle according to an exemplary embodiment. The device 800 may be provided as a base station or a core network equipment. Referring to FIG. 8, the device 800 includes a processing assembly 822, a wireless transmitting/receiving assembly 824, an antenna assembly 826, and a signal processing portion specific to the wireless interface, and the processing assembly 822 may further include one or more processors.

One of processors in the processing assembly 822 may be configured to perform the method for determining a flight path of an unmanned aerial vehicle described in the first aspect mentioned above.

In an exemplary embodiment, a non-transitory computer readable storage medium including instructions is further provided. The instructions may be executed by the processing assembly 822 of the device 800 to perform the method described in the first or third aspect mentioned above. For example, the non-transitory computer readable storage medium may be a ROM, a Random Access Memory (RAM), a CD-ROM, a magnetic tape, a soft disk, an optical data storage device, and the like.

Other embodiments of the disclosure will be apparent to those skilled in the art from consideration of the specification and practice of the disclosure disclosed herein. This application is intended to cover any variations, uses, or adaptations of the disclosure following, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

It will be understood that the present disclosure is not limited to the precise arrangements that have been described above and shown in the drawings, and may be modified and changed without departing from the scope thereof. The scope of the present disclosure is limited only by the appended claims.

The invention claimed is:

1. A method for determining a flight path of an unmanned aerial vehicle, applied to a core network device, the method comprising:
   acquiring an initial flight path configured by an unmanned aerial vehicle management platform for the unmanned aerial vehicle;
   determining a first group of accessible base stations of the unmanned aerial vehicle on the initial flight path based on the initial flight path, wherein the first group of accessible base stations are base stations capable to be accessed when the unmanned aerial vehicle flies on the initial flight path;
   acquiring a second group of accessible base stations capable of providing continuous cellular network services for the unmanned aerial vehicle when the first group of accessible base stations are unable to provide the continuous cellular network services for the unmanned aerial vehicle;
   determining a flight path corresponding to the second group of accessible base stations as a target flight path;
   acquiring a coverage area and load information of each of base stations in the first group of accessible base stations;
   determining serviceable base stations capable of serving the unmanned aerial vehicle based on the load information for each of the base stations; and
   determining that the first group of accessible base stations are unable to provide the continuous cellular network services for the unmanned aerial vehicle when the coverage area of each of the serviceable base stations is unable to fully cover the initial flight path.

2. The method of claim 1, wherein the acquiring a second group of accessible base stations capable of providing the continuous cellular network services for the unmanned aerial vehicle, comprises:
   determining a non-coverage area in which cellular network services are unavailable to the unmanned aerial vehicle, based on the coverage area of the serviceable base stations of the unmanned aerial vehicle;
   determining a target base station based on the non-coverage area; and
   determining the second group of accessible base stations based on the first group of accessible base stations and the target base station.

3. The method of claim 1, wherein the acquiring the coverage area and the load information of each of base stations in the first group of accessible base stations, comprises:
   sending a request message to each of base stations in the first group of accessible base stations; and
   receiving the coverage area and the load information returned by each of the base stations based on the request message.

4. The method of claim 1, further comprising:
   sending the target flight path to a currently accessed base station of the unmanned aerial vehicle, so that the currently accessed base station of the unmanned aerial vehicle forwards the target flight path to the unmanned aerial vehicle; or
   sending the target flight path to the currently accessed base station of the unmanned aerial vehicle management platform, so that the currently accessed base station for the unmanned aerial vehicle management platform forwards the target flight path to the unmanned aerial vehicle management platform.

5. The method of claim 1, wherein the acquiring an initial flight path configured by an unmanned aerial vehicle management platform for the unmanned aerial vehicle, comprises:
   receiving the initial flight path sent by the unmanned aerial vehicle through a currently accessed base station of the unmanned aerial vehicle; or
   receiving the initial flight path sent by the unmanned aerial vehicle management platform through the currently accessed base station of the unmanned aerial vehicle management platform.

6. A core network device, comprising:
   a processor;
   memory for storing processor-executable instructions;
   wherein the processor is configured to:
   acquire an initial flight path configured by an unmanned aerial vehicle management platform for an unmanned aerial vehicle;
   determine a first group of accessible base stations of the unmanned aerial vehicle on the initial flight path, based on the initial flight path, wherein the first group of accessible base stations are base stations capable to be accessed when the unmanned aerial vehicle flies on the initial flight path;
   acquire a second group of accessible base stations capable of providing continuous cellular network services for the unmanned aerial vehicle, when the first group of accessible base stations are unable to provide the continuous cellular network services for the unmanned aerial vehicle;
   determine a flight path corresponding to the second group of accessible base stations as a target flight path;
   acquire a coverage area and load information of each of base stations in the first group of accessible base stations;
   determine serviceable base stations capable of serving the unmanned aerial vehicle based on the load information for each of the base stations; and
   determine that the first group of accessible base stations are unable to provide the continuous cellular network services for the unmanned aerial vehicle when the coverage area of each of the serviceable base stations is unable to fully cover the initial flight path.

7. A non-transitory computer readable storage medium having computer instructions stored thereon for execution by a processor to perform:
acquiring an initial flight path configured by an unmanned aerial vehicle management platform for an unmanned aerial vehicle;
determining a first group of accessible base stations of the unmanned aerial vehicle on the initial flight path, based on the initial flight path, wherein the first group of accessible base stations are base stations capable to be accessed when the unmanned aerial vehicle flies on the initial flight path;
acquiring a second group of accessible base stations capable of providing continuous cellular network services for the unmanned aerial vehicle, when the first group of accessible base stations are unable to provide the continuous cellular network services for the unmanned aerial vehicle;
determining a flight path corresponding to the second group of accessible base stations as a target flight path;
acquiring a coverage area and load information of each of base stations in the first group of accessible base stations;
determining serviceable base stations capable of serving the unmanned aerial vehicle based on the load information for each of the base stations; and
determining that the first group of accessible base stations are unable to provide the continuous cellular network services for the unmanned aerial vehicle when the coverage area of each of the serviceable base stations is unable to fully cover the initial flight path.

8. The non-transitory computer readable storage medium of claim 7, wherein the acquiring a second group of accessible base stations capable of providing the continuous cellular network services for the unmanned aerial vehicle comprises:
determining a non-coverage area in which cellular network services are unavailable to the unmanned aerial vehicle, based on the coverage area of the serviceable base stations of the unmanned aerial vehicle;
determining a target base station based on the non-coverage area; and
determining the second group of accessible base stations based on the first group of accessible base stations and the target base station.

9. The non-transitory computer readable storage medium of claim 7, wherein the acquiring the coverage area and the load information of each of base stations in the first group of accessible base stations comprises:
sending a request message to each of base stations in the first group of accessible base stations; and
receiving the coverage area and the load information returned by each of the base stations based on the request message.

10. The non-transitory computer readable storage medium of claim 7, wherein the instructions are further executed by the processor to perform:
sending the target flight path to a currently accessed base station of the unmanned aerial vehicle, so that the currently accessed base station of the unmanned aerial vehicle forwards the target flight path to the unmanned aerial vehicle; or
sending the target flight path to the currently accessed base station of the unmanned aerial vehicle management platform, so that the currently accessed base station for the unmanned aerial vehicle management platform forwards the target flight path to the unmanned aerial vehicle management platform.

11. The non-transitory computer readable storage medium of claim 7, wherein the acquiring an initial flight path configured by an unmanned aerial vehicle management platform for the unmanned aerial vehicle comprises:
receiving the initial flight path sent by the unmanned aerial vehicle through a currently accessed base station of the unmanned aerial vehicle; or
receiving the initial flight path sent by the unmanned aerial vehicle management platform through the currently accessed base station of the unmanned aerial vehicle management platform.

12. The core network device of claim 6, wherein acquiring a second group of accessible base stations capable of providing continuous cellular network services for the unmanned aerial vehicle comprises:
determining a non-coverage area in which cellular network services are unavailable to the unmanned aerial vehicle, based on the coverage area of the serviceable base stations of the unmanned aerial vehicle;
determining a target base station based on the non-coverage area; and
determining the second group of accessible base stations based on the first group of accessible base stations and the target base station.

13. The core network device of claim 6, wherein the acquiring the coverage area and the load information of each of base stations in the first group of accessible base stations, comprises:
sending a request message to each of base stations in the first group of accessible base stations; and
receiving the coverage area and the load information returned by each of the base stations based on the request message.

14. The core network device of claim 6, wherein the processor is further configured to:
send the target flight path to a currently accessed base station of the unmanned aerial vehicle, so that the currently accessed base station of the unmanned aerial vehicle forwards the target flight path to the unmanned aerial vehicle; or
send the target flight path to the currently accessed base station of the unmanned aerial vehicle management platform, so that the currently accessed base station for the unmanned aerial vehicle management platform forwards the target flight path to the unmanned aerial vehicle management platform.

15. The core network device of claim 6, wherein the acquiring an initial flight path configured by an unmanned aerial vehicle management platform for the unmanned aerial vehicle, comprises:
receiving the initial flight path sent by the unmanned aerial vehicle through a currently accessed base station of the unmanned aerial vehicle; or
receiving the initial flight path sent by the unmanned aerial vehicle management platform through the currently accessed base station of the unmanned aerial vehicle management platform.

16. A communication system implementing the method of claim 1, comprising the core network device, wherein the core network device is configured to automatically adjust the flight path of the unmanned aerial vehicle from the initial flight path to the target flight path upon determining that satisfactory network services cannot be provided for the unmanned aerial vehicle flying according to the initial flight path, to thereby enable a cellular network to provide satisfactory network services for the unmanned aerial vehicle, and improve mobility of the unmanned aerial vehicle.

17. The communication system of claim 16, further comprising the unmanned aerial vehicle, and the unmanned aerial vehicle management platform for the unmanned aerial vehicle.

\* \* \* \* \*